(12) United States Patent
Chow et al.

(10) Patent No.: US 10,061,996 B1
(45) Date of Patent: Aug. 28, 2018

(54) FACE RECOGNITION METHOD AND SYSTEM FOR PERSONAL IDENTIFICATION AND AUTHENTICATION

(71) Applicant: Hampen Technology Corporation Limited, Hong Kong (HK)

(72) Inventors: Felix Chow, Hong Kong (HK); Chiu Wa Ng, Hong Kong (HK); Chun Ho Yip, Hong Kong (HK); How Chun Lau, Hong Kong (HK)

(73) Assignee: HAMPEN TECHNOLOGY CORPORATION LIMITED, Hong Kong (HK)

( * ) Notice: Subject to any disclaimer, the term of this patent is extended or adjusted under 35 U.S.C. 154(b) by 0 days.

(21) Appl. No.: 15/727,717

(22) Filed: Oct. 9, 2017

(51) Int. Cl.
*G06K 9/00* (2006.01)
*G06F 21/32* (2013.01)

(52) U.S. Cl.
CPC ......... *G06K 9/00906* (2013.01); *G06F 21/32* (2013.01); *G06K 9/00255* (2013.01); *G06K 9/00268* (2013.01); *G06K 9/00288* (2013.01)

(58) Field of Classification Search
CPC ... H04L 63/0861; H04L 63/10; H04L 63/102; H04L 63/1416; H04L 63/1483; G06F 21/32; G06F 21/34; G06Q 20/40145; G06K 9/00221; G06K 9/00906; G06K 9/56; G06T 2207/20024; G06T 2207/30196; G06T 7/0026; G06T 7/32; G06T 7/70; G06T 7/90; H04N 5/225
See application file for complete search history.

(56) References Cited

U.S. PATENT DOCUMENTS

| | | | | |
|---|---|---|---|---|
| 6,922,478 B1* | 7/2005 | Konen | ............... | G06K 9/00221 382/115 |
| 7,436,988 B2* | 10/2008 | Zhang | ................ | G06K 9/00268 382/118 |
| 9,251,427 B1* | 2/2016 | Chu | .................... | G06K 9/00221 |
| 2013/0044055 A1* | 2/2013 | Karmarkar | .............. | G06F 3/013 345/158 |
| 2014/0337930 A1* | 11/2014 | Hoyos | ..................... | H04L 63/10 726/4 |
| 2015/0161434 A1* | 6/2015 | Ross | .................. | G06K 9/00288 382/118 |
| 2015/0379332 A1* | 12/2015 | Matsunaga | ........ | G06K 9/00315 348/77 |

* cited by examiner

*Primary Examiner* — Tom Y Lu
(74) *Attorney, Agent, or Firm* — Idea Intellectual Limited; Margaret A. Burke; Sam T. Yip (57) ABSTRACT

The present invention comprises capturing an image of a subject to be authenticated; a step of face verification; followed by the process steps of a scan line detection test, a specular reflection detection test, and a chromatic moment and color diversity feature analysis test in no particular order. The method requires a subject to present her face before a camera, which can be the built-in or peripheral camera of e.g. a mobile communication device or a mobile computing device. The method also requires displaying to the subject certain instructions and the real-time video feedback of the subject face on a display screen, which can be the built-in or peripheral display screen of the mobile communication device or mobile computing device.

17 Claims, 11 Drawing Sheets

FACE RECOGNITION METHOD AND SYSTEM FOR PERSONAL IDENTIFICATION AND AUTHENTICATION

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates generally to anti-spoofing in face recognition for personal identification, authentication, and other security purposes. Particularly, the present invention relates to a face recognition method and system for tackling spoofing with real-time reenactment video on a high definition display.

BACKGROUND

Face recognition has numerous security-related applications such as user identification, user authentication for online and offline resource accesses, door and gate unlocking.

Figure 1:
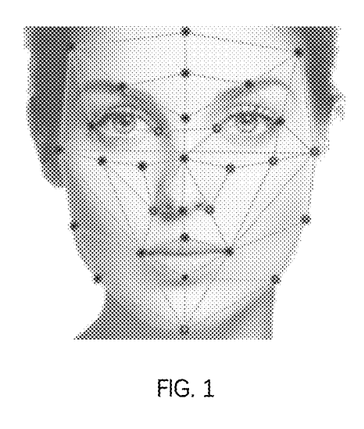
FIG. 1 illustrates how characteristic data are extracted from a face region in a general face recognition system.

Conventionally, face recognition methods use a real-time captured image of the subject's face to find a match in a library of previously captured facial images. The face matching process is relatively accurate in comparison to other biometric identification methods with well-developed and tested facial feature analysis techniques. In general, the techniques extract characteristic data of a face region as shown in FIG. 1, which is unique for each person, from the captured image of the subject's face, and compares the characteristic data against those stored in the library, thereby matching the subject's face to that of a previously registered person.

Figure 2:
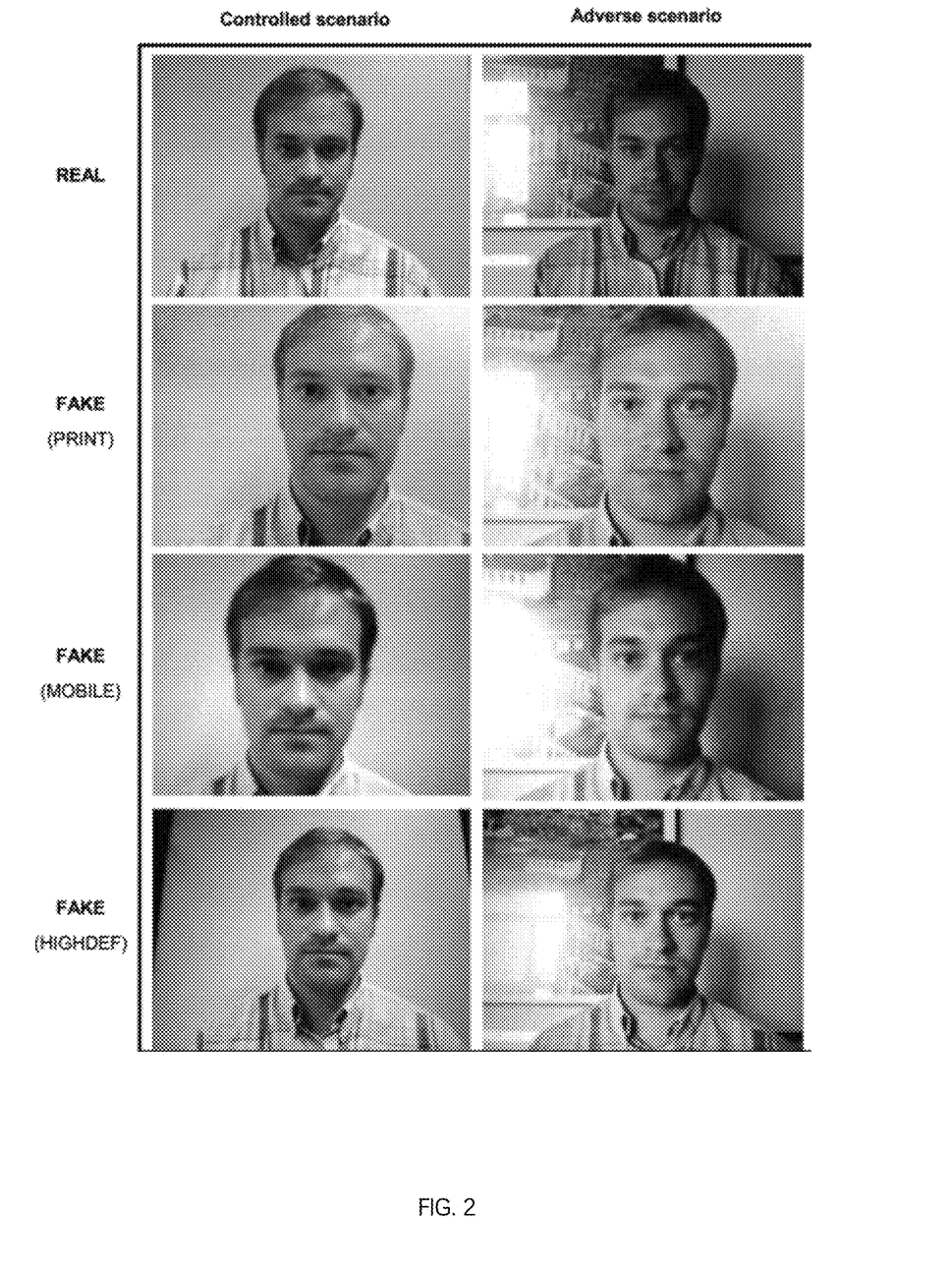
FIG. 2 illustrates examples of a printed photograph or an electronic display showing images of a target's face to be authenticated which may be used to deceive a face recognition system.

Some face recognition systems have been developed to determine whether the subject is a living person by ways of requiring the subject to make multiple facial expressions and movements during an identification session and allowing the system to detect and capture the multiple frames of facial expressions and movements for matching. For example, U.S. Pat. No. 6,922,478 disclosed a method for verifying the authenticity of a captured image of a person comprising recording a sequence of consecutive individual images of the person and determining the authenticity of the recorded images by checking if at least in two consecutive individual images of the sequence intrinsic movements can be detected. However, such an authenticity verifying system may be deceived by printed photographs or an electronic display showing images of the subject to be authenticated as illustrated in FIG. 2.

Other face recognition systems have been developed to determine whether the captured face image is of a living body by ways of requiring interactive inputs from the subject to be recognized. For example, European Patent No. 1990770 disclosed a face authenticating apparatus includes a presentation pattern display unit provided at a different position from a key input unit to display an instruction for a user to input a key pattern during facial authentication; and an image capturing unit for capturing the face of the user and/or a movement of a portion of the face of the user during a portion of or the entire time from when the presentation pattern display unit displays the instruction to when the key input is completed. And from process executed by the apparatus, determine whether the captured face image is of a living person. However, the requirement for interactive inputs limits its applications, usefulness, and the types of users.

Figure 3:
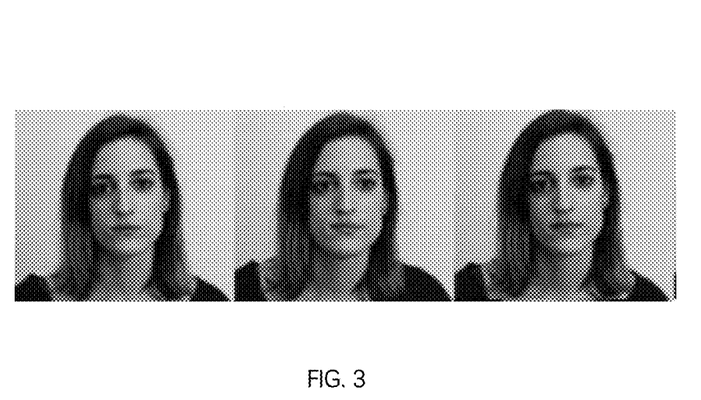
FIG. 3 illustrates a scenario where a subject maintains perfect face alignment with the camera center causing a face recognition system to produce a false rejection.

Improvements have been made to tackle the photo spoofing and facemask spoofing by ways of checking the three-dimensional (3D) perspective features of the face of the subject. For example, U.S. Pat. No. 9,619,723 disclosed a process of 3D perspective check comprising collecting two or more images of the subject's face. The two or more images of the subject's face are then used to calculate the stereoscopic view data of the subject's face. However, such a face recognition system could produce false rejection if the subject maintains perfect face alignment with the camera center as illustrated in FIG. 3.

SUMMARY OF THE INVENTION:

It is an objective of the present invention to provide a face-recognition method and system for personal identification and authentication with anti-spoofing functions capable of effectively detecting whether the subject is a living person or a high definition display of a target's face. It is a further objective of the present invention to provide a simplified method and system of personal identification and authentication that does not require interactive inputs from the subject to be recognized which might not be feasible in certain applications or for certain types of users. It is a still further objective of the present invention to provide a simplified method and system of personal identification and authentication that does not require a 3D perspective test which might produce false rejection in situation where a subject perfectly aligns her face with the camera center.

In accordance to one embodiment of the present invention, the method of personal identification and authentication comprises capturing an image of a subject to be authenticated; a step of face verification; followed by the process steps of a scan line detection test, a specular reflection detection test, and a chromatic moment and color diversity feature analysis test in no particular order. The method requires a subject to present her face before a camera, which can be the built-in or peripheral camera of e.g. a mobile communication or computing device, a computer, or a stationary electronic device. The method also requires displaying to the subject certain instructions and the real-time video feedback of the subject's face on a display screen, which can be the built-in or peripheral display screen of the mobile communication or computing device, computer, or stationary electronic device.

The step of face verification is to capture an image of the subject's face in a single frame shot, then preliminarily verifying the identity of the subject by matching the single frame face image against a database of pre-recorded face data records using existing face analysis and recognition techniques.

Figure 6:
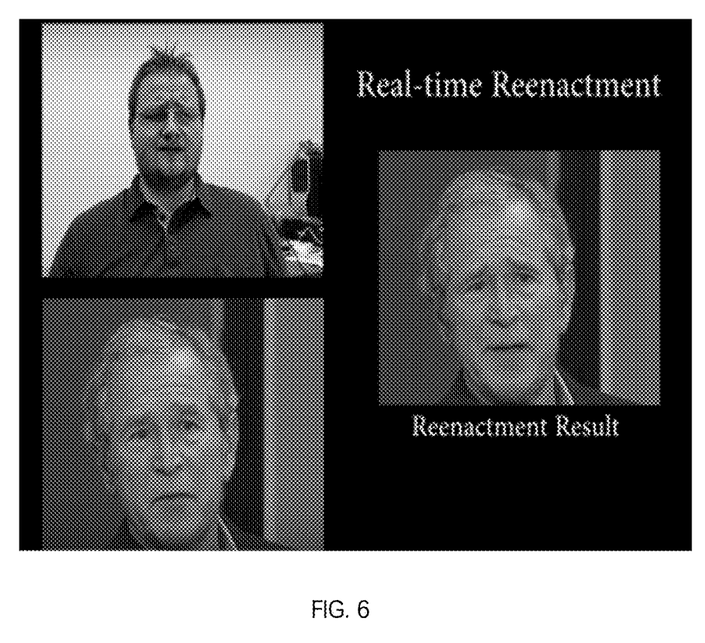
FIG. 6 shows the images extracted from a pre-recorded or real-time reenactment video of the person.

The scan line detection test is based on detecting Moiré patterns created by the overlapping of the digital grid of a spoof image from a digital media display and the grid of an image sensor of a camera in a face-recognition system. As illustrated in FIG. 6, the spoof image may be an image extracted from a pre-recorded or real-time reenactment video of a person's face displayed on a high-resolution display such as a liquid crystal display (LCD) display.

The specular reflection detection test is based on the detection of specular reflection features of spoof images displayed in photographs or digital media displays having mirror or reflective surfaces. This is based on the general phenomenon that specular reflection is more likely to happen on a photo or a digital display which are usually of mirror or reflective surfaces whereas diffuse reflection happens on a genuine human face.

In accordance to one embodiment, the specular reflection detection test comprises extracting multi-dimensional specular reflection features from the input image wherein the extraction comprises: discarding pixels of intensities outside of pre-defined range; and classifying the extracted specular reflection features to determine whether the input image is an image of a genuine face or a spoof image. Preferably, a support vector machine (SVM) based classifier trained with certain training sets is used to classify the extracted specular reflection features.

Figure 9:
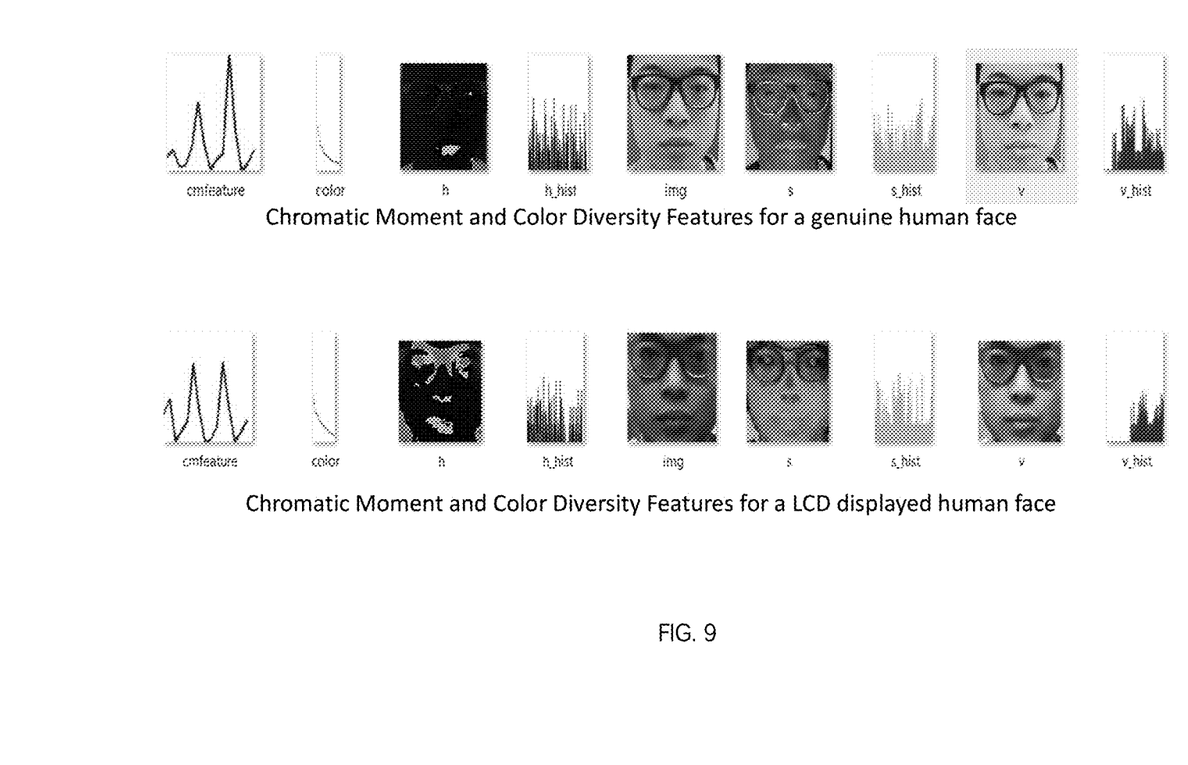
FIG. 9 illustrates the principle of the chromatic moment and color diversity analysis test in accordance to an embodiment of the present invention.

Referring to FIG. 9. The chromatic moment and color diversity analysis test employs a process in which the chromatic features and color histogram of a spoof image, which can be a reproduced face image shown on a printed photo or displayed by a digital media display such as a LCD display, are analyzed to see if its color diversity is reduced in comparison with an image of a genuine face. This is based on the fact that reproduced face images have different color distribution compared to color distribution of genuine faces due to imperfect color reproduction property of printing and digital display.

In accordance to one embodiment, the chromatic moment and color diversity analysis test comprises extracting the chromatic features and color histogram features of the input image in both hue, saturation, and value (HSV) value space, and red, green, and blue (RGB) color space; and classifying the extracted chromatic features and color histogram features to determine whether the input image is an image of a genuine face or a spoof image. Preferably, a SVM based classifier trained with certain training sets is used to classify the extracted chromatic features and color histogram features. In general, SVM scores of greater than or equal to zero signifies a positive detection whereas a negative value signifies a rejection.

BRIEF DESCRIPTION OF THE DRAWINGS

Embodiments of the invention are described in more detail hereinafter with reference to the drawings, in which.

DETAILED DESCRIPTION

In the following description, face recognition methods and systems of personal identification and authentication with anti-spoofing functions and the likes are set forth as preferred examples. It will be apparent to those skilled in the art that modifications, including additions and/or substitutions may be made without departing from the scope and spirit of the invention. Specific details may be omitted so as not to obscure the invention; however, the disclosure is written to enable one skilled in the art to practice the teachings herein without undue experimentation.

In accordance to one embodiment of the present invention, the face recognition system of personal identification and authentication with anti-video-spoofing functions is implemented in a mobile communication device (e.g. "smartphone" and personal digital assistant), a mobile or personal computing device (e.g. "tablet" computer, laptop computer, and personal computer), a kiosk, or a user terminal having a built-in or peripheral camera and an electronic display screen. The face recognition system comprises at least machine instructions for rendering and controlling a graphical user interface displayed on the electronic display screen, machine instructions for controlling the camera for capturing images and videos, and machine instructions for performing the face recognition and anti-video-spoofing algorithms; wherein the machine instructions can be executed using general purpose or specialized computing devices, computer processors, or electronic circuitries including, but not limited to, digital signal processors (DSP), application specific integrated circuits (ASIC), field programmable gate arrays (FPGA), and other programmable logic devices.

Figure 10:
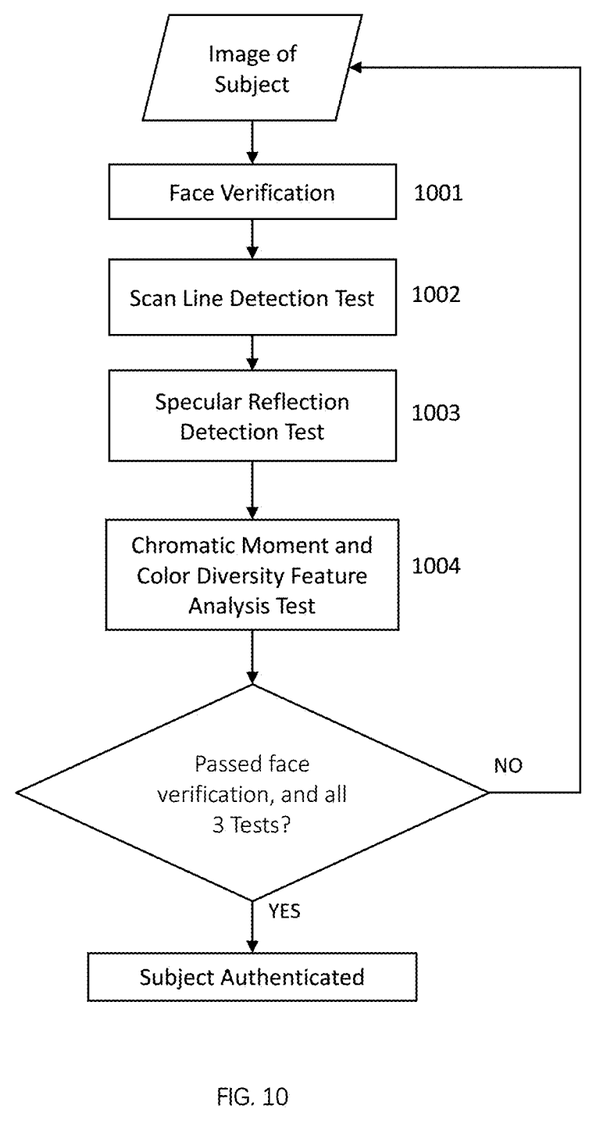
FIG. 10 depicts a process of face recognition method of personal identification and authentication with anti-spoofing functions in accordance to one embodiment of the present invention.

Referring to FIG. 10. In one embodiment of the present invention, the face recognition method for personal identification and authentication comprises capturing an input image of an subject to be authenticated; conducting face verification 1001 to verify the identity of the subject by matching the input image against a database of pre-recorded face data records using a face analysis and recognition method, which can be based on presently available techniques; conducting anti-spoofing tests including a scan line detection test 1002, a specular reflection detection test 1003, and a chromatic moment and color diversity feature analysis test 1004. Although the steps 1002, 1003, and 1004 are performed in the order as presented in FIG. 10, other ordering are also possible without departing from the scope of the present invention. The method requires a subject to present her face before a camera, which can be the built-in or peripheral camera of e.g. a mobile communication or computing device, a computer, or a stationary electronic device. The method also requires displaying to the subject certain instructions and the real-time video feedback of the subject's face on a display screen, which can be the built-in or peripheral display screen of the mobile communication or computing device, computer, or stationary electronic device.

Figure 4:
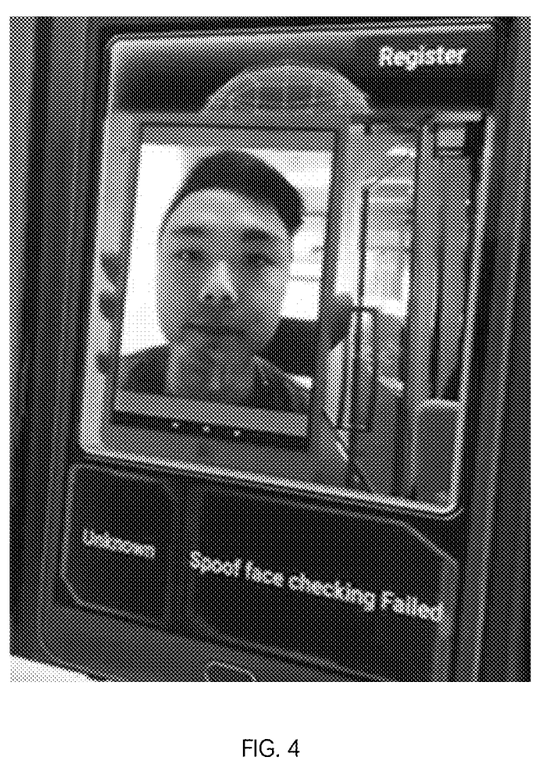
FIG. 4 shows an exemplary user interface of a face verification apparatus in accordance to an embodiment of the present invention.

In one embodiment of the present invention, the step of face verification is to capture an image of the subject's face in a single frame shot, then preliminarily verifying the identity of the subject by matching the single frame face image against a database of pre-recorded face data records using existing face analysis and recognition techniques. FIG. 4 shows an exemplary user interface of a face verification apparatus in accordance to an embodiment of the present invention.

Figure 5:
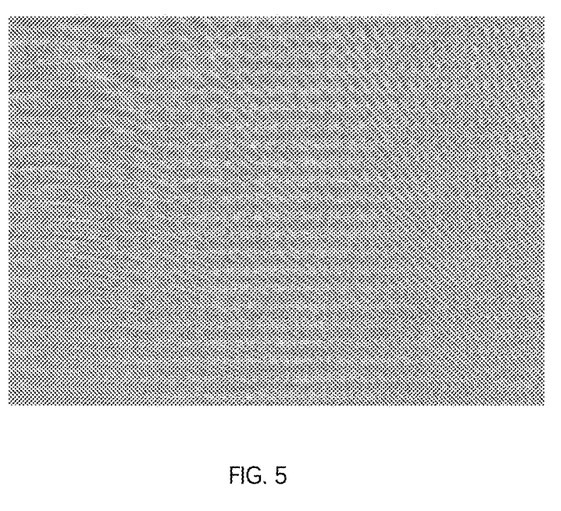
FIG. 5 shows the Moiré patterns created by the overlapping of the digital grid of an image from a digital media display and the grid of an image sensor of a camera.
Figure 7A:
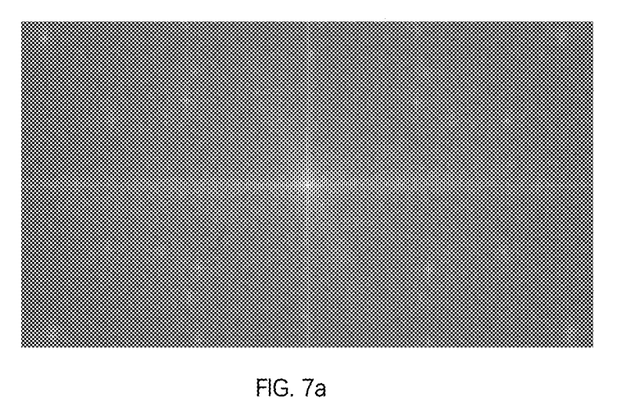
FIG. 7a illustrates the frequency domain of a spoof image captured from a LCD display.
Figure 7B:
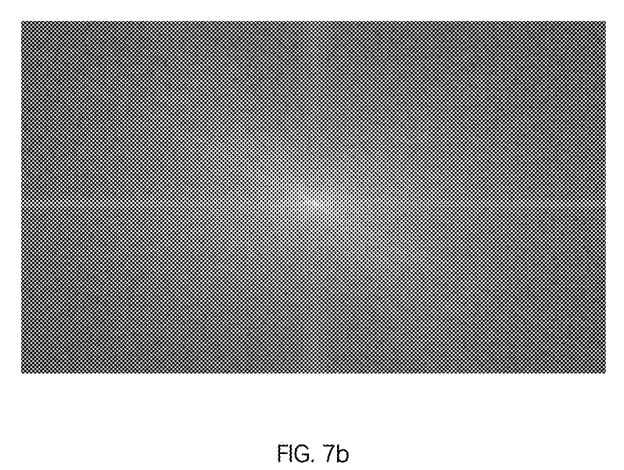
FIG. 7b illustrates the frequency domain of an image captured from a person.

In one embodiment of the present invention, the scan line detection test is to detect Moiré patterns, as shown in FIG. 5, created by the overlapping of the digital grid from a digital media display and the grid of the image sensor of the camera in the face-recognition system to determine whether the input image is a spoof image provided with a digital media display such as LCD display. As shown in FIGS. 7a and 7b, peaks can be found in frequency domain of a spoof image captured from a LCD display due to the Moiré patterns whereas no peaks are found in frequency domain of an image captured from a living person.

Figure 11:
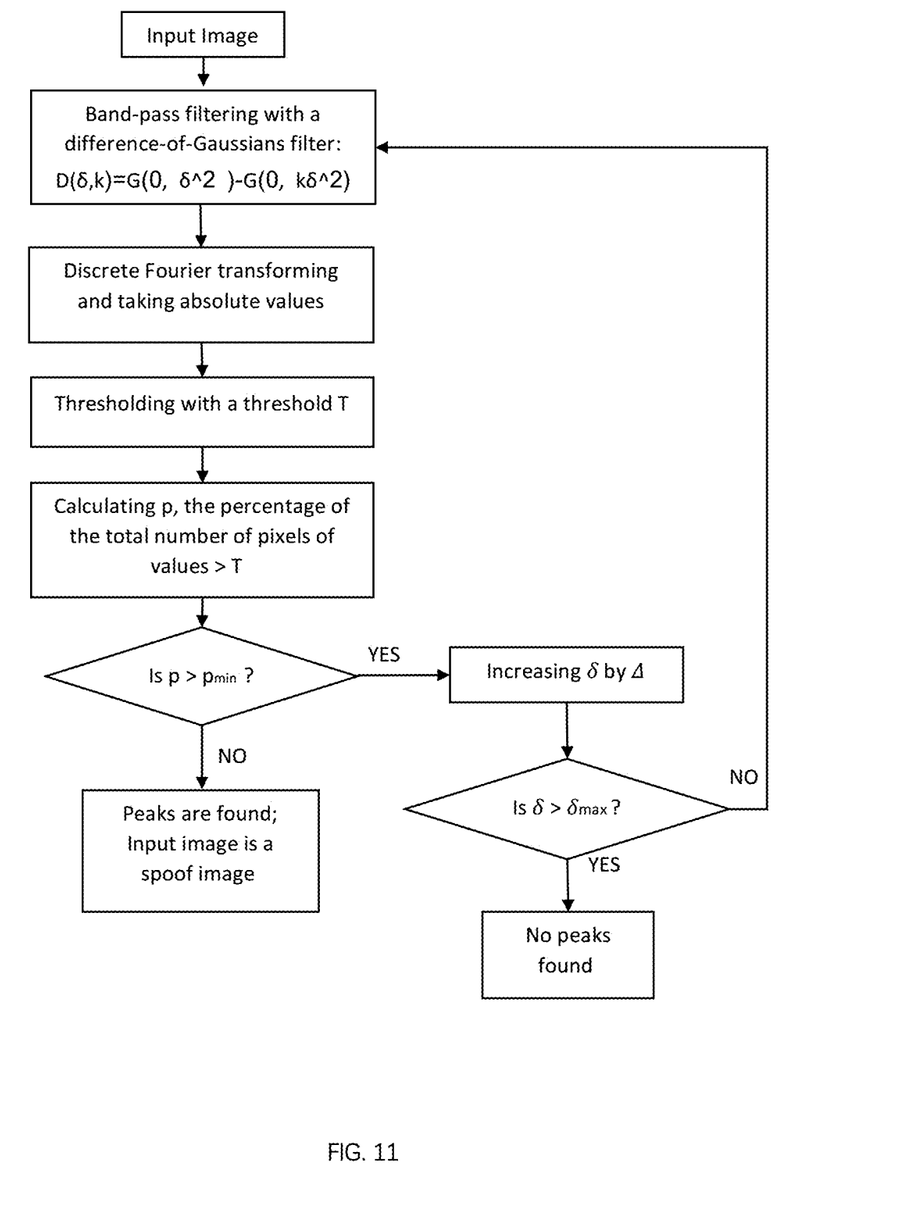
FIG. 11 depicts the process steps of the scan line detection test in accordance to an embodiment of the present invention.

Referring to FIG. 11. In one embodiment of the present invention, the scan line detection test comprises the following steps:
a) applying band-pass filtering on the input image, I, with a difference-of-Gaussians filter: $D(\delta,k)=G(0, \delta^2)-G(0, k\delta^2)$, to generate a band-pass-filtered image: $\Gamma=I*D(\delta,k)$, where $G(0,\delta^2)$ is a 2D-Gaussian function with zero mean and a standard deviation $\delta$ and k is the width of frequency band;
b) converting the filtered image into frequency domain: $H=|DFT(\Gamma)|$, by performing a Discrete Fourier Transform (DFT) and taking absolute values on the outputs;
c) applying thresholding on the filtered image H in frequency domain with a threshold T;
d) counting the number of pixels of the filtered image in frequency domain with values higher than the threshold T and calculating the percentage p of the total number of pixels in the input image with values higher than the threshold T; and
e) determining that peaks exist in the filtered image in frequency domain and the input image is a spoof image if $p \leq p_{min}$, where $p_{min}$ is a pre-defined minimum value of percentage of the total number of pixels in the input image.

In one embodiment of the present invention, the scan line detection test further comprises increasing the standard deviation $\delta$ by an increment of $\Delta$ if $p>p_{min}$; repeating the afore-said steps from applying band-pass filtering to determining existence of peaks if $\delta \leq \delta_{max}$, where $\delta_{max}$ is a pre-defined maximum value of $\delta$; and determining that no peaks exist in the input image if $\delta > \delta_{max}$.

Figure 8:
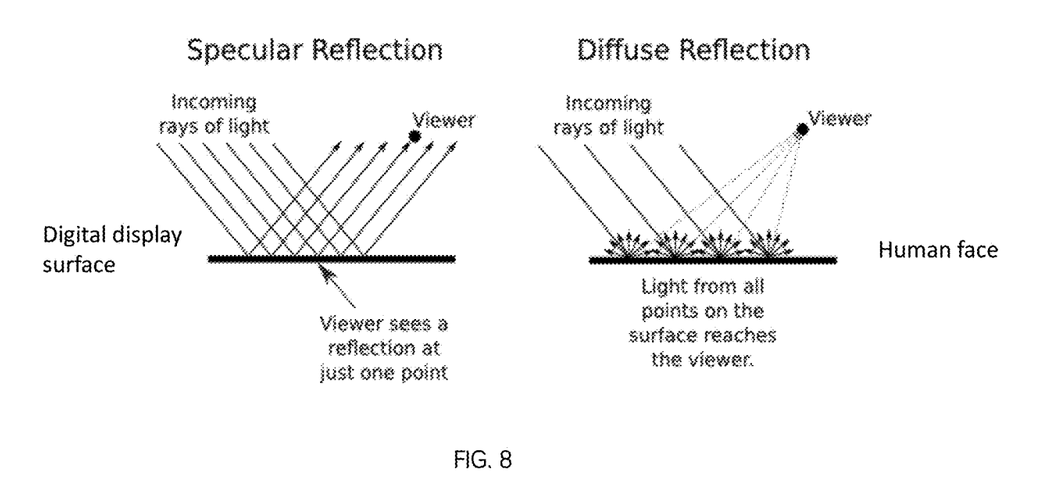
FIG. 8 illustrates the principle of the specular reflection detection test in accordance to an embodiment of the present invention.

Referring to FIG. 8. The specular reflection detection test is to detect specular reflection features of a mirror or reflective surface to determine whether the input image is a spoof image provided with a photograph or a digital media display. The specular reflection detection test is based on the detection of specular reflection features of spoof images displayed in photographs or digital media displays having mirror or reflective surfaces. This is based on the fact that specular reflection is more likely to happen on a photo or a digital display which are usually of mirror or reflective surfaces whereas diffuse reflection happens on a genuine human face.

In one embodiment of the present invention, the specular reflective component is extracted from the input image. The process involves separating the reflective component versus the diffuse component based on their chromaticity variation under varying light intensity. For diffuse color, the chromaticity stays constant. The specular reflection detection test then comprises: extracting multi-dimensional specular reflection features from the input image, wherein the specular reflective features comprise a specular pixel percentage, an intensity value, and a variation of the pixels; discarding one or more pixels of intensities outside of a pre-defined intensity range (e.g. discarding the one or more pixels with intensities outside of the range $[1\mu, 5\mu]$, where $\mu$ is the mean pixel intensity value); classifying, using machine learning techniques, the extracted specular reflection features to determine whether the input image is a spoof image. Preferably, a SVM based classifier trained with certain training sets is used to classify the extracted specular reflection features. During training, the SVM based classifier is given a number, e.g. thousands, of sample specular reflection features each marked as belonging to either genuine image category or spoof image category for building a model that can classify new examples to the one category or the other (e.g. classification result $>=0$) or the other (e.g. classification result $<0$).

The chromatic moment and color diversity analysis is based on the general phenomenon of that reproduced face images have a different color distribution than that of genuine face images that is caused by imperfect color reproduction property of printing and digital displays. In addition, color diversity is also reduced in reproduced face images whereas genuine face images generally have richer colors. The chromatic moment and color diversity analysis test is to detect if the color diversity of the input image is reduced in order to determine whether the input image is a spoof image provided with a print photograph or a digital media display.

In accordance to one embodiment, the chromatic moment and color diversity analysis comprises extracting the chromatic features and color histogram features of the input image in both HSV and RGB spaces; classifying, using machine learning techniques, the extracted chromatic features and color histogram features to determine whether the input image is a spoof image. Preferably, a SVM based classifier trained with certain training sets is used to classify the extracted chromatic features and color histogram features. During training, the SVM based classifier is given a number, e.g. thousands, of sample chromatic features and color histogram features each marked as belonging to either genuine image category or spoof image category for building a model that can classify new examples to the one category (e.g. classification result $>=0$) or the other (e.g. classification result $<0$).

The embodiments disclosed herein may be implemented using general purpose or specialized computing devices, computer processors, or electronic circuitries including but not limited to digital signal processors (DSP), application specific integrated circuits (ASIC), field programmable gate arrays (FPGA), and other programmable logic devices configured or programmed according to the teachings of the present disclosure. Computer instructions or software codes running in the general purpose or specialized computing devices, computer processors, or programmable logic devices can readily be prepared by practitioners skilled in the software or electronic art based on the teachings of the present disclosure.

In some embodiments, the present invention includes computer storage media having computer instructions or software codes stored therein which can be used to program computers or microprocessors to perform any of the processes of the present invention. The storage media can include, but are not limited to, floppy disks, optical discs, Blu-ray Disc, DVD, CD-ROMs, and magneto-optical disks, ROMs, RAMs, flash memory devices, or any type of media or devices suitable for storing instructions, codes, and/or data.

The foregoing description of the present invention has been provided for the purposes of illustration and description. It is not intended to be exhaustive or to limit the invention to the precise forms disclosed. Many modifications and variations will be apparent to the practitioner skilled in the art.

The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A face recognition method for personal identification and authentication comprising:
    capturing an input image of a subject to be identified and authenticated with a camera;
    verifying, by a first processor, the identity of the subject by matching the input image against a database of pre-recorded face data records;
    conducting, by a second processor, in no particular order, anti-spoofing tests on the input image including:
        a scan line detection test for detecting Moiré patterns created by an overlapping of digital grid from a digital media display and grid of the camera image sensor, wherein the input image is a spoof image if Moiré patterns are detected;
        a specular reflection detection test for detecting one or more specular reflection features of a mirror or reflective surface from the input image, wherein the input image is a spoof image if one or more specular reflection features of a mirror or reflective surface are detected; and
        a chromatic moment and color diversity feature analysis test;
    wherein color diversity of the input image is analyzed to determine whether the input image is a spoof image; and
    wherein the chromatic moment and color diversity analysis comprises:
        extracting chromatic features and color histogram features from the input image in both HSV and RGB spaces; and
        classifying the extracted chromatic features and color histogram features to determine whether the input image is a spoof image.

2. The method of claim 1, wherein the scan line detection test comprises:
    a) applying band-pass filtering on the input image with a difference-of-Gaussians filter $D(\delta,k)=G(0, \delta^2)-G(0, k\delta^2)$ to generate a band-pass-filtered image, wherein $G(0,\delta^2)$ is a 2D-Gaussian function with zero mean and a standard deviation $\delta$ and k is the width of frequency band;
    b) converting the band-pass-filtered image into frequency domain by discrete Fourier transformation and taking absolute values on the outputs;
    c) applying thresholding on the band-pass-filtered image in frequency domain with a threshold T;
    d) counting the number of pixels of the band-pass-filtered image in frequency domain with values higher than the threshold T and calculating the percentage, p, of the total number of pixels in the input image with values higher than the threshold T; and
    e) determining whether high frequency peaks exist in the band-pass-filtered image in frequency domain, wherein the input image is a spoof image if $p \leq p_{min}$, wherein $p_{min}$ is a pre-defined minimum value of percentage of the total number of pixels in the input image.

3. The method of claim 2, wherein the scan line detection test further comprises steps:
    increasing a standard deviation $\delta$ by an increment of $\Delta$ if $p > p_{min}$; and
    repeating steps a) to e) if $\delta \leq \delta_{max}$, wherein $\delta_{max}$ is a pre-defined maximum value of $\delta$.

4. The method of claim 1, wherein the specular reflection detection test comprises:
    extracting multi-dimensional specular reflection features from the input image;
    discarding pixels of intensities outside of a pre-defined range; and
    classifying the extracted specular reflection features to determine whether the input image is a spoof image.

5. The method of claim 4, wherein the pre-defined range is from one times a mean value of the pixels' intensities to five times the mean value.

6. The method of claim 4, wherein the extracted specular reflection features are classified with a support vector machine (SVM) based classifier trained with certain training sets.

7. The method of claim 1, wherein the extracted chromatic features and color histogram features are classified with a SVM based classifier trained with certain training sets.

8. A face recognition system for personal identification and authentication comprising:
    one or more computer processors, a camera, a storage media, and a display screen;
    wherein the face recognition system is configured to:
        capture an input image of a subject to be identified and authenticated with the camera;
        verify identity of the subject by matching the input image against a database of pre-recorded face data records stored in the storage media;
        conduct, in no particular order, anti-spoofing tests on the input image including:
            a scan line detection test for detecting Moiré patterns created by an overlapping of digital grid from a digital media display and grid of the camera image sensor, wherein the input image is a spoof image if Moiré patterns are detected;
            a specular reflection detection test for detecting one or more specular reflection features of a mirror or reflective surface from the input image, wherein the input image is a spoof image image if one or more specular reflection features of a mirror or reflective surface are detected; and
            a chromatic moment and color diversity feature analysis test, wherein the color diversity of the input image is analyzed to determine whether the input image is a spoof image.

9. The system of claim 8, wherein the scan line detection test comprises steps:
   a) applying band-pass filtering on the input image with a difference-of-Gaussians filter $D(\delta,k)=G(0, \delta^2)-G(0, k\delta^2)$ to generate a band-pass-filtered image, where $G(0,\delta\Lambda2)$ is a 2D-Gaussian function with zero mean and a standard deviation $\delta$ and k is the width of frequency band;
   b) converting the band-pass-filtered image into frequency domain by discrete Fourier transformation and taking absolute values on the outputs;
   c) applying thresholding on the band-pass-filtered image in frequency domain with a threshold T;
   d) counting the number of pixels of the band-pass-filtered image in frequency domain with values higher than the threshold T and calculating the percentage, p, of the total number of pixels in the input image with values higher than the threshold T; and
   e) determining whether high frequency peaks exist in the filtered image in frequency domain, wherein the input image is a spoof image if $p \leq p_{min}$, where $p_{min}$ is a pre-defined minimum value of percentage of the total number of pixels in the input image.

10. The system of claim 9, wherein the scan line detection test further comprises steps:
   increasing a standard deviation $\delta$ by an increment of $\Delta$ if $p > p_{min}$; and
   repeating steps a) to e) if $\delta \leq \delta_{max}$, wherein $\delta_{max}$ is a pre-defined maximum value of $\delta$.

11. The system of claim 8, wherein the specular reflection detection test comprises steps:
   extracting multi-dimensional specular reflection features from the input image;
   discarding pixels of intensities outside of a pre-defined range; and
   classifying the extracted specular reflection features to determine whether the input image is a spoof image.

12. The system of claim 11, wherein the pre-defined range is from one times a mean value of the pixels' intensities to five times the mean value.

13. The system of claim 11, wherein the extracted specular reflection features are classified with a support vector machine (SVM) based classifier trained with certain training sets.

14. The system of claim 8, wherein the extracted chromatic features and color histogram features are classified with a SVM based classifier trained with certain training sets.

15. The system of claim 8, wherein the system is a mobile communication or computing device.

16. The system of claim 8, wherein the system is a kiosk or a user terminal.

17. A face recognition method for personal identification and authentication comprising:
   capturing an input image of a subject to be identified and authenticated with a camera;
   verifying, by a first processor, the identity of the subject by matching the input image against a database of pre-recorded face data records;
   conducting, by a second processor, in no particular order, anti-spoofing tests on the input image including:
      a scan line detection test for detecting Moiré patterns created by an overlapping of digital grid from a digital media display and grid of the camera image sensor, wherein the input image is a spoof image if Moiré patterns are detected;
      a specular reflection detection test for detecting one or more specular reflection features of a mirror or reflective surface from the input image, wherein the input image is a spoof image if one or more specular reflection features of a mirror or reflective surface are detected; and
      a chromatic moment and color diversity feature analysis test;
   extracting multi-dimensional specular reflection features from the input image;
   discarding pixels of intensities outside of a pre-defined range; and
   classifying the extracted specular reflection features to determine whether the input image is a spoof image;
   wherein color diversity of the input image is analyzed to determine whether the input image is a spoof image.

* * * * *